A. J. COOK.
CHAIN LOCK.
APPLICATION FILED SEPT. 15, 1919.
1,334,133.                                                     Patented Mar. 16, 1920.
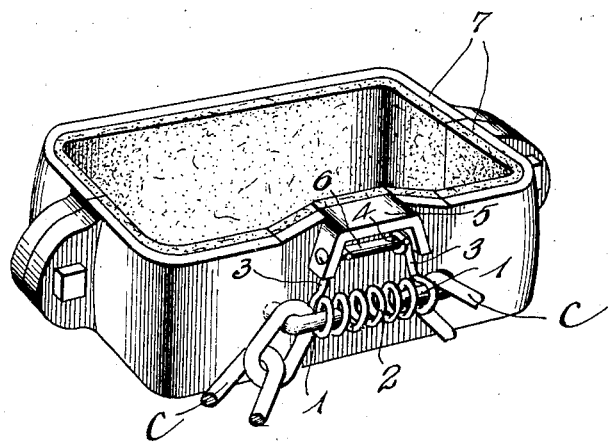
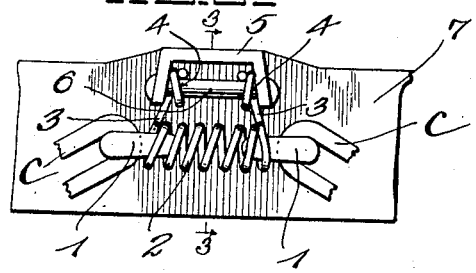
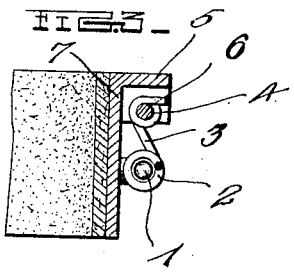
Witness
George W. Giovannetti
Inventor
A. J. Cook
By H. R. Wilson & Co.
Attorneys

UNITED STATES PATENT OFFICE.

ADONIRAM J. COOK, OF WESTERLO, NEW YORK.

CHAIN-LOCK.

1,334,133. Specification of Letters Patent. Patented Mar. 16, 1920.

Application filed September 15, 1919. Serial No. 323,722.

*To all whom it may concern:*

Be it known that I, ADONIRAM J. COOK, a citizen of the United States, residing at Westerlo, in the county of Albany and State of New York, have invented certain new and useful Improvements in Chain-Locks; and I do declare the following to be a full, clear, and exact description of the invention, such as will enable others skilled in the art to which it appertains to make and use the same.

This invention relates to improvements in chain locks, and it is more particularly designed for use in connection with anti-skid chains such as are applied to automobile truck wheels, although it is not to be restricted to such use.

Heretofore it has been customary in devices of this nature to provide a spoke engaging member or clamp which is provided with integral opposed hooks over which the end links of the tire chain are secured and held against displacement by a keeper or retainer which is carried by the spoke engaging member and is disposed between the ends of the hooks and links.

It is therefore the object of this invention to provide a keeper or link retainer of a more simple construction than those known to me, which is effective in use, easy to manipulate, and is exceedingly inexpensive to manufacture and readily replaceable when it becomes broken.

Another object of the invention is to provide a retainer or keeper which is of such construction and is so arranged on the carrying means that it may be readily disengaged from the hooks, without the use of tools or other implements, and swung away from the hooks and thereby facilitate the application and removal of the chain links to or from the hooks, thereby saving time and labor.

In the accompanying drawings forming a part of this specification and in which like numerals are employed to designate like parts throughout the same:—

Figure 1 is a perspective view of a device constructed in accordance with my invention;

Fig. 2 is a front elevation of the link retainer, the carrying means being broken away;

Fig. 3 is a vertical section on the plane of the line 3—3 of Fig. 2.

In carrying out my invention I employ a pair of opposed hooks 1 over which the end pair links of the chain C are attached and between which a coiled spring 2 is disposed, which is adapted to receive the bills of the said hooks 1 therein and prevent displacement of the links. The spring 2 is preferably provided with a pair of laterally extending arms 3 which have eyes 4 formed at their extremities. I also provide a recessed or arched lug 5 and extend a pivot pin 6 through the lug and eyes 4, and thereby permit the whole spring to be swung up or down on the pin 6, when the spring is disengaged from the hooks 1. Although the hooks 1 and arched lug 5 may be secured to any suitable carrying means, I preferably employ a two-part clamp 7 with which the hooks 1 and lugs 5 are integrally cast.

The coiled spring or link retainer 2 is preferably formed from a single piece of wire which is coiled between its ends as shown, the opposite ends thereof being extended in a lateral direction from the coiled portion to form the aforesaid arms 3. The eyes 4 are formed by merely coiling the extremities of the arms 3. The pivot pin 6 which extends through the eyes 4 may be secured to the clamp 7 in any suitable manner, but as before stated it is preferably carried in an arched lug 5, which includes apertured outwardly extending ears which are reinforced and connected together by a web plate.

In use, the clamp or spoke engaging member 7 is placed in position on the spoke of a wheel. Once fitted to the spoke it can or may remain there permanently, making the attachment of the anti-skid chain the only operation necessary. To attach the chain to the hooks 1 it will be convenient to compress the spring 2 enough to disengage it from the hooks 1. Having done this the whole spring may be swung upward on its pivot pin 6 which will clear the ends of the hooks from obstruction and facilitate the application of the chain links thereto. After the links of the chain C are passed over the hooks 1 the coiled spring 2 may again be swung down and compressed by the fingers and assume the position shown in Fig. 1 in which position, the links will be held against displacement from the hooks. Of course it is to be understood that the tension of the spring 2 will be strong enough to retain the end links of the chain on the hooks under any and all conditions.

It is to be understood that the form of my invention herein shown and described is to be taken as a preferred embodiment of the same and that various changes in the shape, size and arrangement of parts may be resorted to without departing from the spirit of the invention or the scope of the subjoined claims.

Having thus described my invention, what I claim is:

1. A chain lock comprising a body, a pair of opposed inturned hooks carried by said body and having their bills spaced from one another, a resilient piece of wire bent intermediate its ends to form a coil adapted to be disposed between the ends of the hook, the bills of the hooks being receivable in the opposite ends of said coil, and the free ends of the wire being attached to said body, whereby when the coil is compressed it may be disengaged from the hooks and moved in a lateral direction with respect to the hooks to permit free application of the chain links.

2. A chain lock comprising a pair of opposed hooks, a coiled spring adapted to be disposed between the ends of said hooks and receive the bills of the hooks therein, said coiled spring being provided with a pair of lateral arms having eyes formed at their ends, a pivot pin extending through said eyes, whereby the spring may swing up or down on said pin when disengaged from the hooks, and carrying means for said hooks and pivot pin.

3. A chain lock comprising two opposed hooks, a coiled spring adapted to be disposed between the ends of said hooks and receive the bills of the hooks therein, said spring being provided with a pair of laterally disposed arms having eyes formed at their extremities, a recessed lug, a pivot pin extending through said lug and eyes in the ends of the said arms to permit the whole spring to be swung up or down on the pivot pin when disengaged from the hooks, and carrying means for said hooks and lug.

4. A chain lock comprising a pair of hooks having their bills disposed in opposed alinement to each other, a coiled spring adapted to be disposed between the ends of said hooks and receive the bills of the hooks therein, said spring being composed of a single piece of wire and having its opposite ends disposed laterally from the body portion thereof thus forming converging arms, said arms having their extremities coiled to form eyes, an arched lug, a pivot pin extending through said lug and eyes, whereby the whole spring may be swung up or down on its pivot when the spring is disengaged from the lugs, and carrying means for the hooks and lug.

In testimony whereof I have hereunto set my hand.

ADONIRAM J. COOK.